United States Patent [19]
Masunaga

[11] Patent Number: 5,847,801
[45] Date of Patent: Dec. 8, 1998

[54] HINGE STRUCTURE AND BEARING MEMBER FOR HINGE IN FRAME OF SPECTACLES

[75] Inventor: Satoru Masunaga, Fukui, Japan

[73] Assignee: Masunaga Optical Mfg. Co., Ltd., Japan

[21] Appl. No.: 833,343

[22] Filed: Apr. 4, 1997

[51] Int. Cl.⁶ .............................. G02C 5/22; G02C 5/00
[52] U.S. Cl. ............................ 351/153; 351/140; 16/228
[58] Field of Search ............................ 351/153, 113, 351/111, 114, 116, 140, 41; 16/228

[56] References Cited

U.S. PATENT DOCUMENTS

4,978,209 12/1990 Ohba ........................................ 351/153

Primary Examiner—Hung X. Dang

[57] ABSTRACT

This invention relates to a hinge structure in a frame of spectacles, wherein a bearing member having a pair of shaft insertion portions is mounted to a lens frame, a bifurcate member having shaft portions is fixed to an end of a temple to be in parallel with the temple, the shaft portions are respectively inserted into the shaft insertion portions such that the bifurcate member is horizontally movable, and a release prevention member is interposed inside the bifurcate member. Even if an external force is applied to a distal end of the bifurcate member, the bifurcate member is never released from the bearing portion, and smooth opening and closing functions of the temple may be guaranteed for a long period of time.

8 Claims, 5 Drawing Sheets

HINGE STRUCTURE AND BEARING MEMBER FOR HINGE IN FRAME OF SPECTACLES

BACKGROUND OF THE INVENTION

1. Field of the Invention

This invention relates to a hinge structure in a frame of spectacles, and more particularly, to the improvement of a spring hinge structure requiring no screw.

2. Description of the Prior Art

Japanese Utility Model Registration No. 3005646, for instance, has disclosed a hinge structure, in which a cylindrical bearing member having both ends respectively provided with shaft insertion holes is mounted to a side of a lens frame, an elastic metal bifurcate member having both ends respectively provided with shaft portions bent in an opening direction is secured to an end of a temple, and the shaft portions are pivotally inserted into the respective shaft insertion holes.

The bifurcate member is regulated to be horizontally movable in an opening range of about 90° with respect to the lens frame. Further, since the bifurcate member is spring-biased in the opening direction due to its own elasticity, the shaft portions are respectively prevented from being released from the shaft insertion holes unless a predetermined external force is applied to the shaft portions.

In the spring hinge structure, since it is not necessary to use a screw in the hinge, the structure is simplified and easily assembled.

According to the hinge structure of conventional type described above, since the bifurcate member is spring-biased in the opening direction, the shaft portions of the bifurcate member are never released from the shaft insertion holes unless an external force is applied to the shaft portions. However, the hinge structure of conventional type poses the following problems.

First, when an external force more than the above spring force is applied to the bifurcate member in the direction against the spring force, that is, in the direction to contract the bifurcate member, the bifurcate member fixed to the temple is released from the shaft insertion holes.

Second, when spring elasticity of the bifurcate member is deteriorated with the passage of time, release of the bifurcate member from the shaft insertion holes as described above easily and frequently occurs. In addition, tension by a spring is deteriorated, and the temple in the opened state is easily closed, so that it is not possible to guarantee long-term stable operation of the temple.

Third, when an external force is applied in the direction reverse to a closing direction on condition that the temple is opened to its limit, such an external force acts as bending pressure on the temple, the bifurcate member and the bearing member, resulting in deformation of these members easily.

SUMMARY OF THE INVENTION

It is an object of the present invention to provide a hinge structure in a frame of spectacles, in which a spring of a bifurcate member forming a part of a temple may be prevented from being deteriorated with the passage of time, and the bifurcate member may be prevented from being released from a bearing portion.

Another object of the present invention is to provide a hinge structure in a frame of spectacles, in which a temple may be operated stably for a long period of time by restraining spring elasticity of a bifurcate member from being deteriorated.

A further object of the present invention is to provide a bearing member for a hinge in a frame of spectacles, in which when an external force is applied in the direction reverse to the closing direction of a temple on condition that the temple is opened to its limit, absorption of such an external force is enabled.

For achieving the above objects, according to the present invention, there is provided the following hinge structure in a frame of spectacles.

That is, according to the first aspect of the present invention, there is provided a hinge structure, wherein:

a bearing member having a pair of shaft insertion portions arranged substantially coaxially at a predetermined interval is mounted to a lens frame;

an elastic metal bifurcate member having both ends respectively provided with shaft portions bent in an opening direction is fixed to an end of a temple so as to be in parallel with the temple;

the shaft portions of the bifurcate member are respectively inserted into the shaft insertion portions so that the bifurcate member is horizontally movable in an opening range of about 90° with respect to the lens frame; and a release prevention member is interposed inside the bifurcate member.

According to the second aspect of the present invention, there is provided a hinge structure according to the first aspect of the present invention, wherein the release prevention member is interposed inside the bifurcate member slidably in the length direction of the bifurcate member.

According to the third aspect of the present invention, there is provided a hinge structure according to the first or second aspect of the present invention, wherein the release prevention member is made of soft or semi-rigid synthetic resin such as urethane resin, and has groove portions to guide opposite portions of pieces of the bifurcate member.

For achieving the above objects, according to the present invention, there is provided the following bearing member for a hinge in a frame of spectacles.

That is, according to the first aspect of the present invention, there is provided a bearing member in the hinge structure in a frame of spectacles according to any one of the first to third aspects of the present invention, wherein the bearing member comprises an attachment piece having a base end provided with a portion to mount the bearing member to a lens frame, and an elastic piece integrated with the base end of the attachment piece, the attachment piece and the elastic piece are provided in the shape of a letter U, or the shape of a channel, or the shape resembling these shapes as a whole as viewed vertically, and the shaft insertion portions are formed at the distal end of the elastic piece.

According to the second aspect of the present invention, there is provided a bearing member according to the first aspect of the present invention, wherein the bearing member is made of semi-rigid synthetic resin such as urethane resin, and the elastic piece is formed thinner than the attachment piece as viewed vertically, and is curved in the shape of a bow to the attachment piece.

In the hinge structure according to the first aspect of the present invention, since the release prevention member is interposed inside the bifurcate member, and both ends of the bifurcate member are prevented by the release prevention member from being dislocated in the closing direction, the bifurcate member is never released from the bearing portions even if an external force is applied to the bifurcate member in the direction to close the ends thereof.

Further, since the release prevention member is interposed to prevent elasticity of the bifurcate member from being deteriorated with the passage of time, it is possible to guarantee smooth opening or closing function of the temple for a long period of time.

In the hinge structure according to the second aspect of the present invention, the following effects may be provided, in addition to the effects in the hinge structure according to the first aspect of the present invention.

First, since the release prevention member is slidably interposed in the bifurcate member, an elastic force acting on both ends of the bifurcate member may be adjusted by sliding the release prevention member in the length direction of the bifurcate member, resulting in adjustment of the hardness of the temple in opening or closing operation according to user's tastes.

Second, the bifurcate member may be easily detached together with the temple from the bearing member by sliding the release prevention member toward the base end of the bifurcate member.

In the hinge structure according to the third aspect of the present invention, the following effects may be provided, in addition to the effects in the hinge structure according to the first and second aspects of the present invention. That is, since the release prevention member is made of soft or semi-rigid synthetic resin and shows somewhat expansive or contractile properties (elasticity), and the shaft portions are slightly contracted to the extent that the shaft portions are not released from the shaft insertion portions when a force acts on both ends of the bifurcate member in the closing direction (for instance, like the snap operation described above), the elasticity of the bifurcate member is more sufficiently prevented from being deteriorated with the passage of time.

Further, since the release prevention member has the grooves provided in the upper and lower portions to guide the opposite sides of both pieces of the bifurcate member, the release prevention member is never released from the bifurcate member, and the grooves serve as a guide in sliding the release prevention member along the bifurcate member, resulting in performing slide operation more smoothly.

In the bearing member for the hinge according to the first aspect of the present invention, the shaft insertion portions are formed at the distal end of the elastic piece. Thus, when a force is applied to the temple further in the opening direction on condition that the temple closed to the lens side is opened to the limit, the elastic piece is bent so as to come closer to the attachment piece, and absorbs such a force.

Therefore, in this case, since an excessive force is hardly applied to the temple and the hinge, the temple and the hinge may be prevented from being deteriorated with the passage of time.

In the bearing member for the hinge according to the second aspect of the present invention, since the whole bearing member is made of a semi-rigid synthetic resin, and the elastic piece is formed to be curved in the shape of a bow to the attachment piece, the elastic piece shows more flexible elasticity, and may more sufficiently absorb an external force applied to the temple in the opening direction.

BRIEF DESCRIPTION OF THE DRAWINGS

The foregoing and other objects and features of the invention will become apparent from the following description of preferred embodiments of the invention with reference to the accompanying drawings, in which.

DESCRIPTION OF PREFERRED EMBODIMENTS

Embodiment 1

FIGS. 1 to 5 show a hinge structure in a frame of spectacles according to an embodiment 1.

Figure 1:
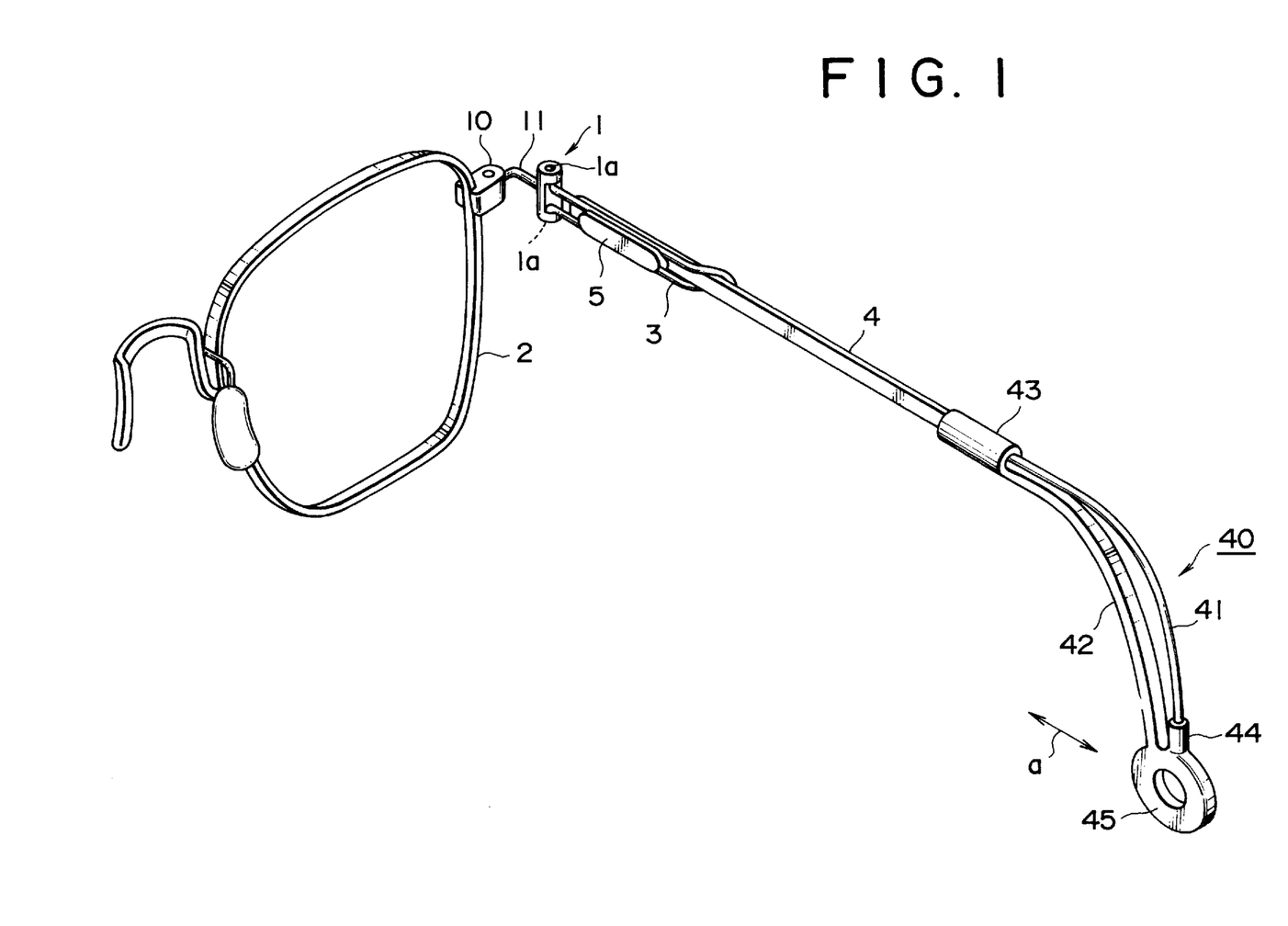
FIG. 1 is a partially perspective view showing a hinge structure according to an embodiment 1.

A metal bearing member 1 is integrally provided with an attachment 10 and a support pin 11 welded to the attachment 10 and bent in the direction of eyes, and a portion of the attachment 10 is mounted to a side of a lens frame 2 by welding.

The bearing member 1 has a cylindrical shape, and is formed so as to extend in a substantially longitudinal direction when spectacles are in use. At the upper and lower ends of the bearing member 1, a pair of shaft insertion portions 1a, 1a are arranged substantially coaxially at a predetermined interval.

A substantially U-shaped bifurcate member 3 made of elastic metal wire is fixed to one end of a temple 4 in the length direction by welding such that the distal ends of the bifurcate member are located at one end of the temple 4 described above.

Figure 3:
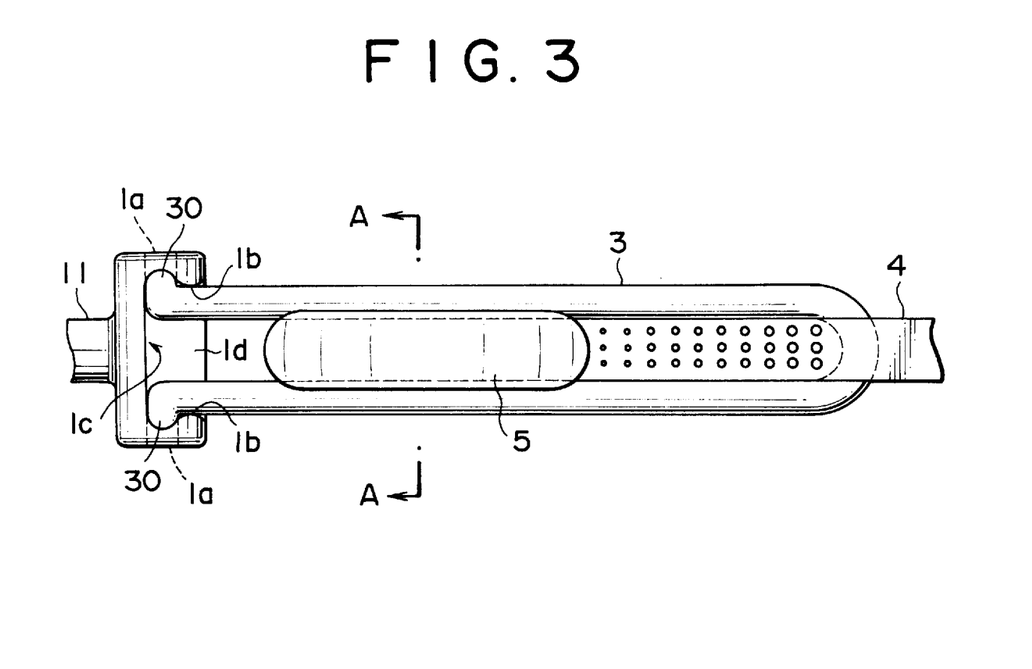
FIG. 3 is an enlarged-scale side view of the hinge structure of FIG. 1 as viewed from the lens side.
Figure 4:
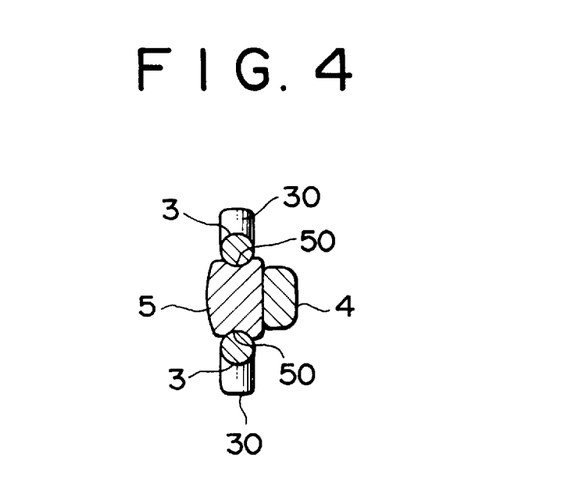
FIG. 4 is a sectional view taken along a line A—A in FIG. 3.

The bifurcate member 3 is biased in an opening direction due to its own elasticity, and shaft portions 30, 30 bent in the opening direction are formed at the distal ends of the bifurcate member, as shown in FIGS. 3 and 4.

A hinge is assembled by pivotally inserting the shaft portions 30, 30 in the shaft insertion portions 1a, 1a of the bearing member 1 from the side of the respective opposite ends. Therefore, the temple 4 performs hinge operation pivotally around the shaft portion 30.

Figure 2:
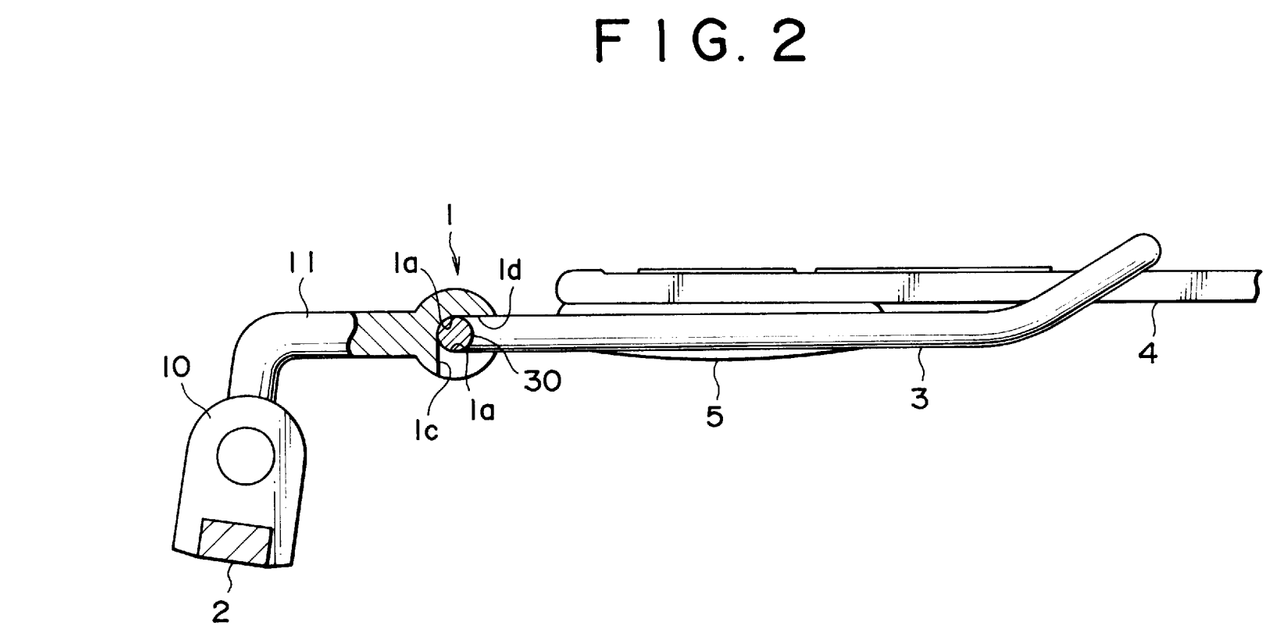
FIG. 2 is a partially broken-away enlarged-scale plan view of the hinge structure shown in FIG. 1.
Figure 5:
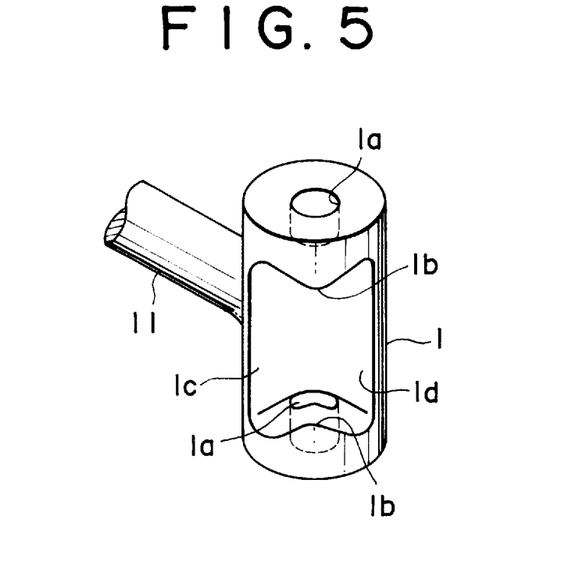
FIG. 5 is a partially enlarged-scale perspective view of a bearing member in the hinge structure of FIG. 1.

In this embodiment, as shown in FIGS. 2 and 5, between the shaft insertion portions 1a, 1a of the bearing member 1, a stopper 1c along the direction of eyes and a stopper 1d along the opening direction at an angle of about 90° with respect to the direction of eyes are formed with the shaft insertion portions 1a, 1a as the center.

Angle-shaped projection portions 1b, 1b facing each other are formed on the opposite ends of the shaft insertion portions 1a, 1a so that the projection portions are located substantially in the center between the stoppers 1c, 1d.

Thus, when the temple 4 closed to the lens side is opened, the bifurcate member 3 is brought into contact with the stopper surface 1d, and the temple 4 is prevented from being opened more.

When the temple 4 is opened or closed, the temple 4 performs snap operation due to its own elasticity from a point of time when the pieces of the bifurcate member 3 respectively pass through the projection portions 1b, 1b.

A release prevention member 5 is interposed inside the bifurcate member 3 so as to prevent both ends of the bifurcate member 3 from being closed.

The release prevention member 5 in this embodiment is made of soft or semi-rigid urethane resin, and is interposed slidably in the length direction of the bifurcate member 3 on condition that the pieces of the bifurcate member 3 are respectively guided to upper and lower groove portions 50, 50 of the release prevention member, as shown in FIG. 4.

As shown in FIG. 1, an end piece 40 of the temple 4 comprises a chord portion 42 made of synthetic resin such as polyester resin and having both ends respectively provided with a hold portion 43 to hold the temple 3 and a circular pad 45, and an elastic arc-shaped pin 41 made of metal wire and having one end held by the hold portion 43 of the chord portion 42, and the other end held by an inserted-pin hold portion 44 of the pad 45.

The end piece 40 having the above structure is preferably formed such that the length of the elastic arc-shaped pin 41 is adjusted by partially adjusting the insertion of either end of the elastic arc-shaped pin 41 into the hold portion 43 or the inserted-pin hold portion 44 by a predetermined amount. When the end piece 40 is structured as described above, the size of an arc of the end piece 40 may be adjusted according to user's tastes by shifting the position of the pad 45 in the direction indicated by an arrow a.

The following effects are provided according to the hinge structure in the embodiment 1. That is, first, since the release prevention member 5 is interposed inside the bifurcate member 3, and both ends of the bifurcate member 3 are prevented by the release prevention member 5 from being dislocated in the closing direction, the shaft portions 30, 30 are never released from the shaft insertion portions 1a, 1a, even if an external force is applied to the bifurcate member in the direction to close the ends thereof.

Second, since the release prevention member 5 is interposed as described above to prevent elasticity of the bifurcate member 3 from being deteriorated with the passage of time, it is possible to guarantee smooth opening and closing operations of the temple 4 for a long period of time.

Third, an elastic force acting on both ends of the bifurcate member 3 may be adjusted by sliding the release prevention member 5 in the length direction of the bifurcate member 3, and the hardness of the temple 4 in opening and closing operations may be adjusted according to user's tastes.

Fourth, the bifurcate member 3 may be easily detached together with the temple 4 from the bearing member 1 by sliding the release prevention member 5 toward the base end of the bifurcate member 3.

Fifth, since the release prevention member 5 is made of soft or semi-rigid synthetic resin and shows somewhat expansive or contractile properties (elasticity), and the shaft portions 30, 30 are slightly contracted to the extent that the shaft portions are not released from the shaft insertion portions 1a,1a when a force is applied to both ends of the bifurcate member 3 in the closing direction (for instance, as in case of snap operation described above), it is possible to further prevent the elasticity of the bifurcate member 3 from being deteriorated with the passage of time.

Sixth, since the upper and lower portions of the grooves 50, 50 to guide the opposite sides of both pieces of the bifurcate member 3, the release prevention member is never released from the bifurcate member 3, and the grooves 50, 50 respectively serve as a guide in sliding the release prevention member 5 along the bifurcate member 3, resulting in performing sliding operation smoothly.

Embodiment 2

Figure 6:
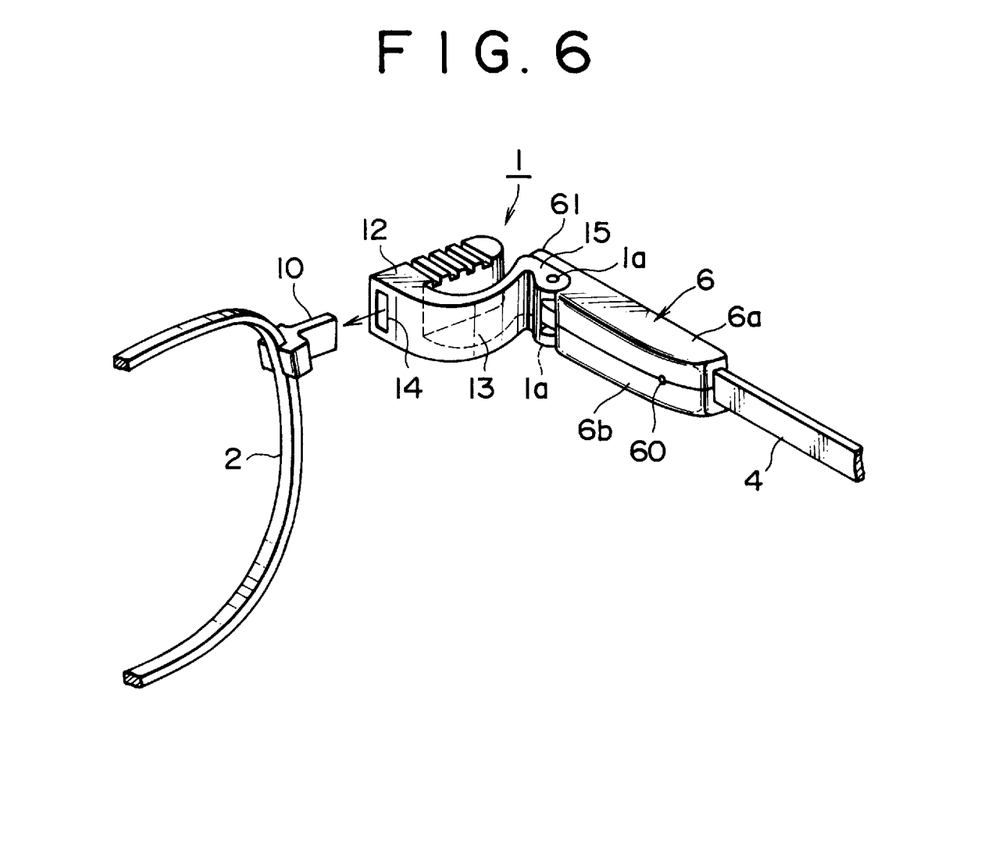
FIG. 6 is a partially perspective view showing a hinge structure according to an embodiment 2 and a bearing member according to an embodiment.
Figure 7:
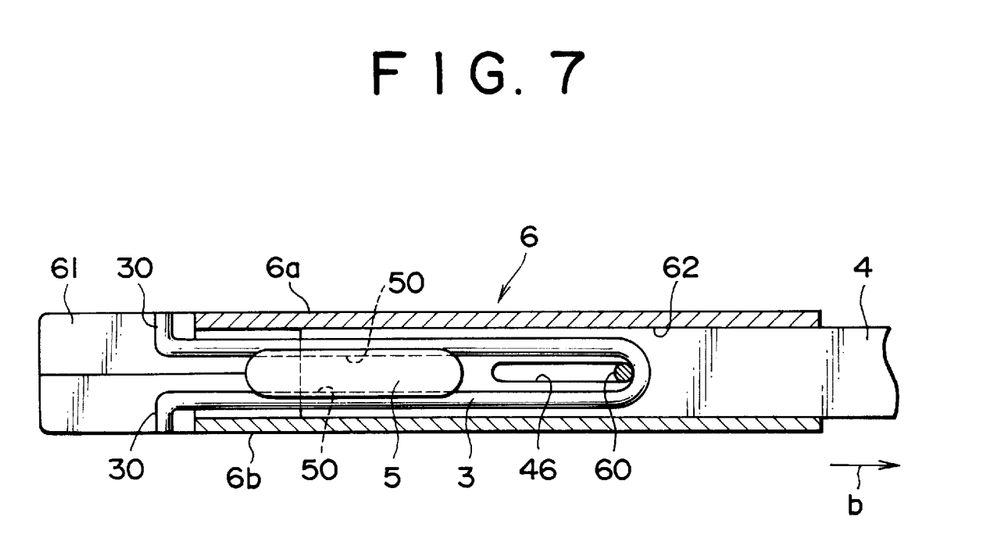
FIG. 7 is a partially enlarged-scale sectional view showing a state, in which a bifurcate member, a release prevention member, a temple and a cover are assembled together, in the hinge structure of FIG. 6.

FIGS. 6 and 7 show another hinge structure and a hinge bearing member in an embodiment according to the present invention.

In the hinge structure in a frame of spectacles according to this embodiment, a bearing member 1 is made of semi-rigid synthetic resin such as polyacetal resin, and comprises an attachment piece 12 having a base end provided with a portion 14 to mount the bearing member to a lens frame 2, and an elastic piece 13 formed integrally with the base end of the attachment piece 12.

The attachment piece 12 and the elastic piece 13 are provided in the shape of a letter U, or the shape of a channel, or the shape resembling these shapes as a whole as viewed vertically, and a pair of shaft insertion portions 1a, 1a are formed at the distal end of the elastic piece 13.

In this embodiment, the elastic piece 13 is formed thinner than the attachment piece 12 as viewed vertically, and is curved in the shape of a bow to the attachment piece 12.

In this embodiment, the mounting portion 14 formed at the base end of the attachment piece 12 is provided in the shape of a rectangular hole, and the bearing member 1 is mounted to a side of the lens frame 2 by inserting an attachment 10 mounted to the side of the lens frame 2 by welding into the hole-shaped mounting portion 14.

The shaft insertion portions 1a, 1a in FIG. 6 and the bifurcate member 3 and the release prevention member 5 in FIG. 7 are basically substantially similar to those of the embodiment 1. However, in this embodiment, the bifurcate member 3 including the release prevention member 5 and the end of the temple 4 are covered with a cover 6 made of synthetic resin such as acrylic resin.

The cover 6 substantially constitutes a part of the temple 4, and is composed of upper and lower covers 6a, 6b. These covers 6a, 6b are bonded together in a state, in which the bifurcate member 3 including the release prevention member 5 and the end of the temple 4 are covered.

The cover 6 is preferably formed as one body by injection molding, instead of bonding the separately-formed covers 6a, 6b together like this embodiment.

As shown in an enlarged-state in FIG. 7, in the cover 6 formed by bonding the upper and lower covers 6a, 6b together, a screw 60 is inserted into the side of the cover 6 such that the screw is brought into contact with the inside of the base end of the bifurcate member 3, resulting in preventing the cover 6 from being detached from the bifurcate member 3.

A slot 46 is formed longitudinally in the end of the temple 4 covered with the cover 6, and the screw 60 pierces the slot 46.

The temple 4 is not welded to the bifurcate member 3 differently from the embodiment 1, and may be slidable along the cover 6 in the direction to adjust the inserting of the temple 6 into the cover 6. The screw 60 functions as a stopper.

That is, when the temple 4 in the state shown in FIG. 7 is pulled in the direction indicated by an arrow b, the temple 4 is extended within the range of the length of the slot 46. On the other hand, when the temple 4 is pushed in the reverse direction, the temple 4 is reduced within the range of the length of the slot 46. Thus, the length of the temple 6 may be adjusted within the range of the length of the slot 46 as a whole.

However, since the bifurcate member 3 is covered with the cover 6, it is not possible to slide the release prevention member 5 along the bifurcate member 3.

As shown in FIG. 7, the shaft portions 30, 30 formed at both ends of the bifurcate member 3 project from the distal end of the cover 6, and these shaft portions 30, 30 are pivotally inserted into the shaft insertion portions 1a, 1a shown in FIG. 6 substantially similarly to the embodiment 1. A stopper 61 projects from the distal end of the cover 6 as shown in FIGS. 6 and 7. When the temple 4 closed to the lens side is opened to the limit, the stopper 61 is brought into contact with the distal end surface of the elastic piece 13 to prevent the temple 4 from being more opened.

Incidentally, portions corresponding to the stoppers 1c, 1d of the bearing member in the first embodiment are formed also in the bearing member 1. However, in this embodiment, since the bearing member 1 is made of the synthetic resin, and the portions corresponding to the stoppers 1c, 1d are easily worn, the stopper 61 is formed at the distal end of the cover 6 as described above in order to prevent the portions corresponding to the stoppers 1c, 1d from being worn.

Other respects of the constitution are substantially similar to those of the hinge structure in the embodiment 1.

The following effects are provided according to the hinge structure and its hinge bearing member in the embodiment 2. That is, first, the shaft insertion portions 1a, 1a are formed at the distal end of the elastic piece 13, and therefore, when a force is applied to the temple 4 further in the opening direction according to the size of a user's face on condition that the temple closed to the lens side is opened to the limit, the elastic piece 13 is bent so as to come closer to the attachment piece 12 and absorbs such a force. Thus, in this case, since an excessive force is hardly applied to the temple 4 and the hinge, it is possible to prevent the temple 4 and the hinge from being deteriorated with the passage of time.

In particular, when the elastic piece 13 is formed to be curved in the shape of a bow to the attachment piece 12, the elastic piece 13 shows more flexible elasticity, and the above effects may be further enhanced.

Second, although the bearing member 1 is made of synthetic resin as a whole and a bearing portion is easily worn, the stopper 61 is formed at the distal end of the cover 6, and therefore, it is possible to restrain the bearing portion from being worn.

Third, it is possible to adjust the length of the temple 4 according to the size of a user's face. Thus, the hinge structure in this embodiment is suitable to a frame of spectacles for an eye examination, in which its user is shifted frequently.

Other embodiments

In the present invention, the bifurcate member 3 is not always integrated in the shape of a letter U or the shape of a channel as a whole, differently from the embodiments described above. It is to be noted that the bifurcate member 3 may be substantially bifurcated and structured to be biased in the opening direction.

The release prevention member 5 is not limited to the structures in the embodiments described above. It is sufficient to interpose the release prevention member 5 inside the bifurcate member 3 so as to prevent each piece of the bifurcate member from being closed.

In the embodiment 2, the mounting portion 14 and the attachment 10 having a structure other than that described above may be used, as far as the bearing member 1 may be mounted to the lens frame 2.

What is claimed is:

1. A hinge structure in a frame of spectacles, comprising:
    a bearing member having a pair of shaft insertion portions arranged substantially coaxially at a predetermined interval, and mounted to a lens frame;
    an elastic metal bifurcate member having both ends respectively provided with shaft portions bent in an opening direction, and fixed to the end of a temple to be in parallel with said temple;
    said shaft portions of said bifurcate member being inserted into said shaft insertion portions so that said bifurcate member is horizontally movable within an opening range of about 90° with respect to said lens frame; and
    a release prevention member interposed inside said bifurcate member.

2. A hinge structure in a frame of spectacles according to claim 1, wherein said release prevention member is interposed slidably in the length direction of said bifurcate member.

3. A hinge structure in a frame of spectacles according to claim 2, wherein said release prevention member is made of soft or semi-rigid synthetic resin such as urethane resin, and has grooves to guide opposite portions of pieces of said bifurcate member.

4. In the hinge structure in a frame of spectacles according to claim 2, a bearing member for a hinge in a frame of spectacles, comprising:
    an attachment piece having a base end provided with a mounting portion to mount the bearing member to a lens frame; and
    an elastic piece formed integrally with the base end of said attachment piece;
    wherein the attachment piece and the elastic piece are provided in the shape of a letter U, or the shape of a channel, or the shape resembling these shapes as viewed vertically, and said shaft insertion portions are formed at the distal end of said elastic piece.

5. A hinge structure in a frame of spectacles according to claim 1, wherein said release prevention member is made of soft or semi-rigid synthetic resin such as urethane resin, and has grooves to guide opposite portions of pieces of said bifurcate member.

6. In the hinge structure in a frame of spectacles according to claim 5, a bearing member for a hinge in a frame of spectacles, comprising:
    an attachment piece having a base end provided with a mounting portion to mount the bearing member to a lens frame; and
    an elastic piece formed integrally with the base end of said attachment piece;

wherein the attachment piece and the elastic piece are provided in the shape of a letter U, or the shape of a channel, or the shape resembling these shapes as viewed vertically, and said shaft insertion portions are formed at the distal end of said elastic piece.

7. In the hinge structure in a frame of spectacles according to claim 1, a bearing member for a hinge in a frame of spectacles, comprising:

an attachment piece having a base end provided with a mounting portion to mount the bearing member to a lens frame; and an elastic piece formed integrally with the base end of said attachment piece;

wherein the attachment piece and the elastic piece are provided in the shape of a letter U, or the shape of a channel, or the shape resembling these shapes as viewed vertically, and said shaft insertion portions are formed at the distal end of said elastic piece.

8. A bearing member for a hinge in a frame of spectacles according to claim 7, wherein said bearing member is made of semi-rigid synthetic resin such as urethane resin, and said elastic piece is formed thinner than said attachment piece as viewed vertically, and is curved in the shape of a bow to said attachment piece.

* * * * *